(12) United States Patent
Lagorgette

(10) Patent No.: US 8,995,234 B2
(45) Date of Patent: Mar. 31, 2015

(54) DATE INDICATION DISPLAY DEVICE

(71) Applicant: ETA SA Manufacture Horlogere Suisse, Grenchen (CH)

(72) Inventor: Pascal Lagorgette, Bienne (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 0 days.

(21) Appl. No.: 14/326,854

(22) Filed: Jul. 9, 2014

(65) Prior Publication Data
US 2015/0036465 A1 Feb. 5, 2015

(30) Foreign Application Priority Data
Aug. 5, 2013 (EP) ..................................... 13179298

(51) Int. Cl.
*G04B 19/247* (2006.01)
*G02B 5/22* (2006.01)
*G02B 5/26* (2006.01)

(52) U.S. Cl.
CPC ................ *G04B 19/247* (2013.01); *G02B 5/22* (2013.01); *G02B 5/26* (2013.01)
USPC .............................................. 368/37; 368/28

(58) Field of Classification Search
USPC ................................................ 368/28, 35–38
See application file for complete search history.

(56) References Cited

U.S. PATENT DOCUMENTS 7,120,091 B1 * 10/2006 Lizzi ................................ 368/37
8,264,912 B2 * 9/2012 Watanabe ........................ 368/38
2005/0111302 A1 5/2005 Willemin et al.
2008/0049557 A1 * 2/2008 Yang ............................... 368/28
2010/0103780 A1 * 4/2010 Chaignat ........................ 368/38
2011/0090767 A1 * 4/2011 Hirano ........................... 368/38
2011/0158052 A1 * 6/2011 Suzuki ........................... 368/38

FOREIGN PATENT DOCUMENTS

DE 297 02 749 U1 4/1997
EP 1 536 300 A1 6/2005

OTHER PUBLICATIONS

European Search Report issued Jan. 27, 2014, in European Application No. 13179298.8 filed Aug. 5, 2013 (with English Translation).

* cited by examiner

*Primary Examiner* — Amy Cohen Johnson
*Assistant Examiner* — Matthew Powell
(74) *Attorney, Agent, or Firm* — Oblon, McClelland, Maier & Neustadt, L.L.P.

(57) ABSTRACT

A date indication display device for a timepiece includes a support element having a plurality of display areas on which are arranged the indications of the days of the month. The support element moves behind an aperture arranged in a dial of the timepiece. The indications of the days of the month are divided into a first and a second group, the two groups being two different colors. A date indication of the first group is superposed on a date indication of the second group on each display area. A first optical filter whose transmittance is chosen to transmit the first color and to block the second color, and a second optical filter whose transmittance is chosen to transmit the second color and to block the first color, are alternately positioned behind the aperture.

9 Claims, 5 Drawing Sheets

DATE INDICATION DISPLAY DEVICE

FIELD OF THE INVENTION

The present invention concerns a device for displaying an indication, such as the date indication for a timepiece.

BACKGROUND OF THE INVENTION

Numerous watches display the day of the month in addition to the hour and minutes. Several solutions exist for achieving this:

The simplest solution consists in using a date ring on the periphery of which the numbers 1 to 31 are noted. The periphery of the date ring passes underneath an aperture arranged in the watch dial and reveals the day of the month. The date indications are regularly angularly distributed around the circumference of the ring.

It is clear that the size of the date indications depends upon the diameter of the ring. It is therefore understood that the larger the size of the date indications, the larger the radius of the date ring will be, and the more space the ring will require in the watch case.

To facilitate the reading of the date, it is evident that one solution is to increase the size of the date indications but with the aforecited limitation.

There are other possibilities for improving the readability of the date.

A first possibility consists of integrating a magnifying glass in the aperture in the dial through which the date indications appear.

Another solution consists in using two superposed date rings. One of these rings carries the numbers 1 to 15 and the other ring carries the numbers 16 to 31. An aperture arranged in the upper ring which moves above the other makes it possible to see the numbers on the lower ring. Spreading the date indications over two rings means that these indications can be larger.

Another principle consists of using two discs. One of the discs carries the tens numbers 0, 1, 2, and 3 while the other disc carries the numbers 0 to 9, namely the units. The two discs are arranged side-by-side, so as to form together the days of the month.

It is understood that the use of two date rings or discs complicates the mechanism, which rather restricts this type of solution to high end watches. Further, these solutions often have the effect of slowing down the change of date. In the case of the mechanism having two juxtaposed discs briefly described above, to change from the 1st day of the month to the 21st day of the month for example, the units disc has to make two complete revolutions in order to drive the other disc from 0 to 2.

SUMMARY OF THE INVENTION

The present invention proposes to provide a novel solution offering more compactness and making it possible to display a larger sized date indication.

To this end, the present invention relates to a date indication display device for a timepiece, said display device including a support element having a plurality of display areas on which are arranged the indications of the days of the month, the support element moving behind an aperture arranged in a dial of the timepiece to reveal one of the date indications arranged on the support element, said display device being characterized in that:

a) the indications of the days of the month are divided into a first and a second group, the date indications of the first group having a first colour, and the date indications of the second group having a second colour, different from that of the date indications of the first group;

b) the number of display areas of the support element is equal to the number of date indications in a group, a date indication of the first group being superposed on a date indication of the second group on each display area;

c) a first optical filter whose transmittance is chosen to transmit the first colour and to block the second colour, and a second optical filter whose transmittance is chosen to transmit the second colour and to block the first colour, the first and second optical filters being alternately positioned behind the aperture.

As a result of these features, the present invention provides a date indication display device for a timepiece wherein 15 indications of the days of the month are arranged on the support element in a first colour, and the 16 remaining date indications are arranged on the support element in a second colour, a date indication in the first colour being superposed on a date indication in the second colour on each display area of the support element. It is thus understood that, when the first optical filter, which lets the first colour pass but blocks the second colour, is placed above the display area, the observer sees the date indication in the first colour but not the date indication in the second colour. Conversely, when the second optical filter, which lets the second colour pass and blocks the first colour, is placed above the display area, the observer sees the date indication in the second colour but not the date indication in the first colour. Thus, for a given surface of the support element, date indications which are substantially two times larger can be arranged on the support element, which considerably improves the readability of the date indications.

BRIEF DESCRIPTION OF THE DRAWINGS

Other features and advantages of the present invention will appear more clearly from the following detailed description of an embodiment of the display device according to the invention, this example being given solely by way of non-limiting illustration with reference to the annexed drawing, in which.

DETAILED DESCRIPTION OF THE INVENTION

The present invention proceeds from the general inventive idea which consists in adding a first and a second group of date indications in two distinct colours to a support element. A date indication of the first group which has a first colour, for example red, and a date indication of the second group which has a second colour, for example blue, are printed on the support element one on top of the other. When a blue filter is placed above the two superposed date indications, the red date indication is visible, while the blue indication is concealed. Conversely, when a red filter is arranged above the two superposed date indications, the red date indication is concealed and the blue indication is visible. It is therefore possible to arrange two distinct date indications on the same display area of the support element. For a given surface of the support element, twice the surface area is thus available for arranging the date indications, which makes it possible to print the date indications in larger dimensions and thus to improve the readability of the date indications.

Figure 1:
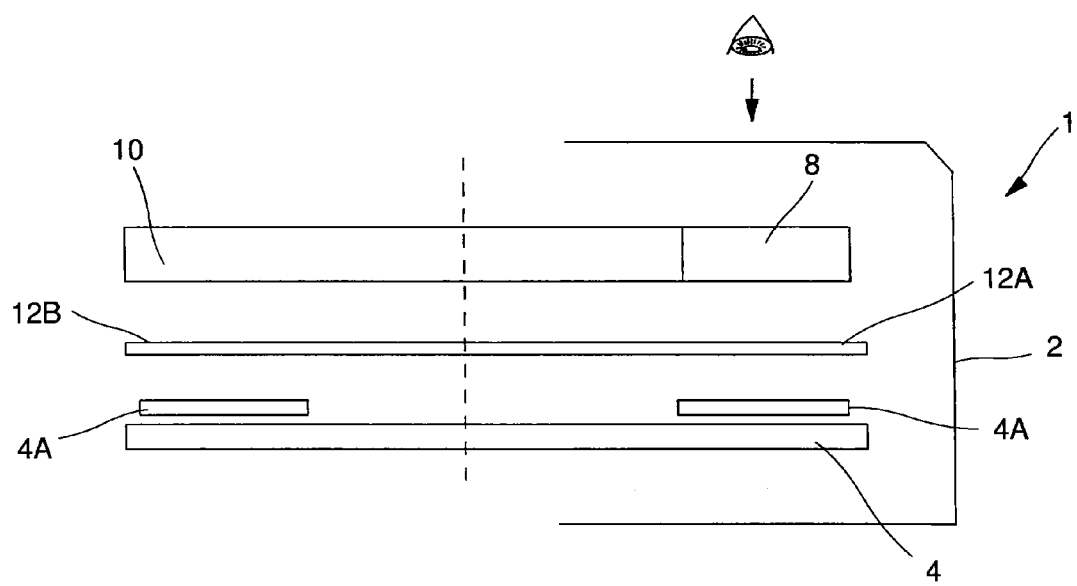
FIG. 1 is a vertical cross-section through the watch case showing the support element, the filters and the dial with its aperture.

A date indication display device according to the invention is shown in cross-section in FIG. 1. Designated as a whole by the general reference numeral 1, this display device, housed inside a watch case 2, includes a support element 4 on which the date indications are printed.

More specifically, support element 4, which is for example disc-shaped, has on the periphery thereof areas 4A for printing date indications 6A, 6B. According to a feature of the invention, the date indications are divided into a first and a second group, date indications 6A of the first group having a first colour, and the date indications 6B of the second group having a second colour, different from that of date indications 6A of the first group. The number of printing areas 4A on support element 4 is limited to the number of date indications in a group and, in each printing area 4A, a date indication 6A of the first group and a date indication 6B of the other group are superposed.

Support 4 is moved in a stepping motion so as to move one step every 24 hours to reveal, in an aperture 8 arranged in a watch dial 10, the date indication of the current day.

This display device 1 is intended to be a watch and is a "Grand Date" display since it enables large numbers to be used.

A first optical filter 12A, whose transmittance is chosen to transmit the first colour of date indications 6A of the first group and to block the second colour of date indications 6B of the second group, and a second optical filter 12B, whose transmittance is chosen to transmit the second colour of date indications 6B of the second group and to block the first colour of date indications 6A of the first group, are alternately positioned behind aperture 8.

Thus, support element 4 which is for example disc or ring shaped, has on the periphery thereof sixteen printing areas 4A distributed over 360°. For example, on one of printing areas 4A, are marked the date indication "21" of the first group in a first colour (for example red), and the date indication "22" of the second group in a second colour (for example blue). If the first optical filter 12A positioned behind aperture 8 is red, the date indication "21" of the first group will not be visible but the date indication "22" will be visible. Conversely, if the second optical filter 12B which is blue, is positioned behind aperture 8, date indication "21" of the first group will be visible but the date indication "22" will not be visible.

Depending on the division of the date indications into the first and second groups, the movement of filters 12A, 12B will occur every other day if the one of the groups comprises the odd numbers (01, 03, 05, . . . 15, . . . 31) and the other the even numbers (02, 04, . . . , 16, . . . 30). Conversely, if one of the groups comprises the numbers from 01 to 15 and the other the numbers from 16 to 31, the movement of filters 12A, 12B will occur between the 15th and 16th day of the month, and between the last day of the month and the first day of the following month.

Those skilled in the art know how to devise the kinematics of support element 4 and filters 12A, 12B in accordance with the selected composition of groups of dates 6A, 6B, the geometric shape of support element 4 and that of filters 12A, 12B. The kinematics of the display device are arranged such that support element 4 of date indications 6A, 6B moves either every day and the filters every fifteen days, or so that support element 4 moves every two days and filters 12A, 12B every day.

In the case where one of the first and second groups comprises the odd numbers, and the other the even numbers, support element 4 of date indications 6A, 6B moves every other day and filters 12A, 12B every day. On support element 4, the date indication "31" is superposed on an empty space. Indeed, the first group which comprises the odd numbers includes sixteen date indications, while the second group, which comprises the even numbers, only has fifteen date indications. Thus, on the last day of a month of thirty-one days, it is the date indication "31" which is visible through the first optical filter 12A. The following day, support element 4 has not moved. Conversely, it is the second optical filter 12B, which is positioned above printing area 4A corresponding to the date indication "31". At that particular moment, no date indication is visible since the date indication "31" is superposed on an empty space and the transmittance of the second optical filter 12B is adapted to transmit the second colour of date indications 6B of the second group and to block the first colour of the date indications 6A of the first group to which the date indication "31" belongs. In this position, the user therefore has to perform a manual correction of the display by advancing support element 4 through one step and positioning the first optical filter 12A behind aperture 8. It will be understood that the user must thereof manually correct the date indication display at the end of each month. In the case where one of the first and second groups is formed of the figures from 01 to 15 and the other of the figures from 16 to 31, support element 4 of date indications 6A, 6B will move once per day and filters 12A, 12B will respectively move between the 15th and 16th day of the month, and between the last day of the month and the first day of the following month. Consequently, on the last day of a month of thirty-one days, the user will have to advance support element 4 through one step and position the first optical filter 12A behind aperture 8.

The filtering means may take the form of a disc or a ring divided into two 180° portions respectively having a first and a second colour.

Figure 5:
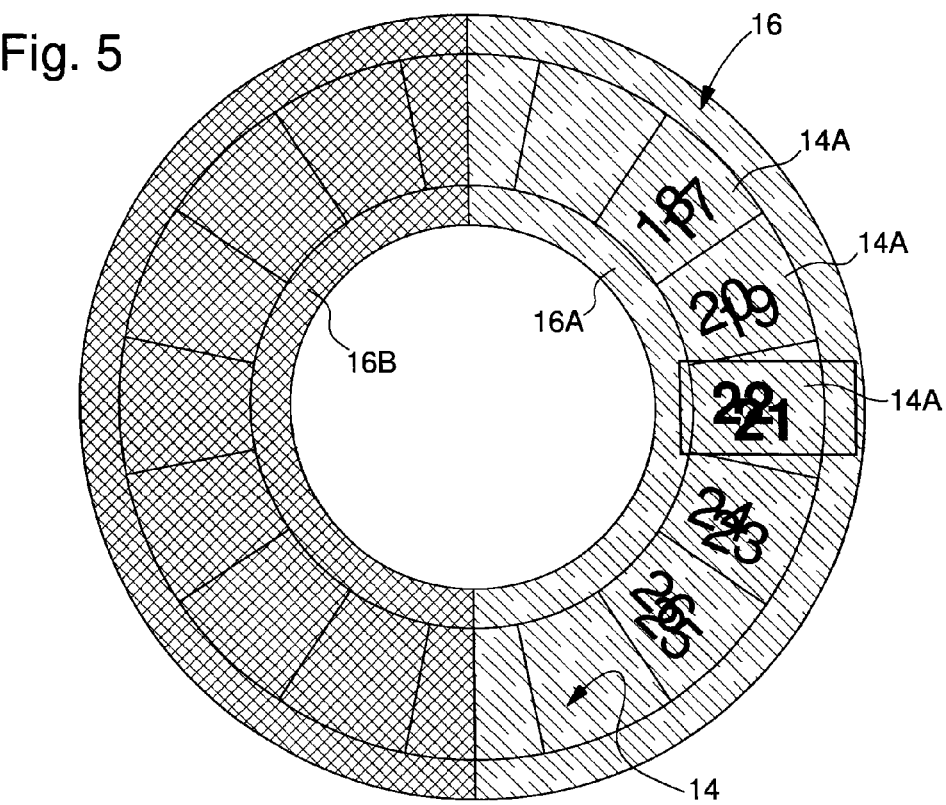
FIG. 5 is a top view of a date ring above which is arranged an optical filter in the form of a ring, a first portion of the ring having a first colour to reveal the date indications belonging to the first group and to conceal the date indications of the second group, and a complementary portion of the first portion of the ring having a second colour to reveal the date indications belonging to the second group and to conceal the date indications belonging to the first group.

By way of example, FIG. 5 is a top view of a date ring 14 which has on the periphery thereof sixteen printing areas 14A distributed over 360°. A ring-shaped optical filter 16 is arranged above date ring 14. A first portion 16A of ring 16 is in a first colour to reveal the date indications belonging to the first group and to conceal the date indications of the second group, and a complementary portion 16B of first portion 16A of ring 16 is in a second colour to reveal the date indications belonging to the second group and to conceal the date indications belonging to the first group.

Figure 6:
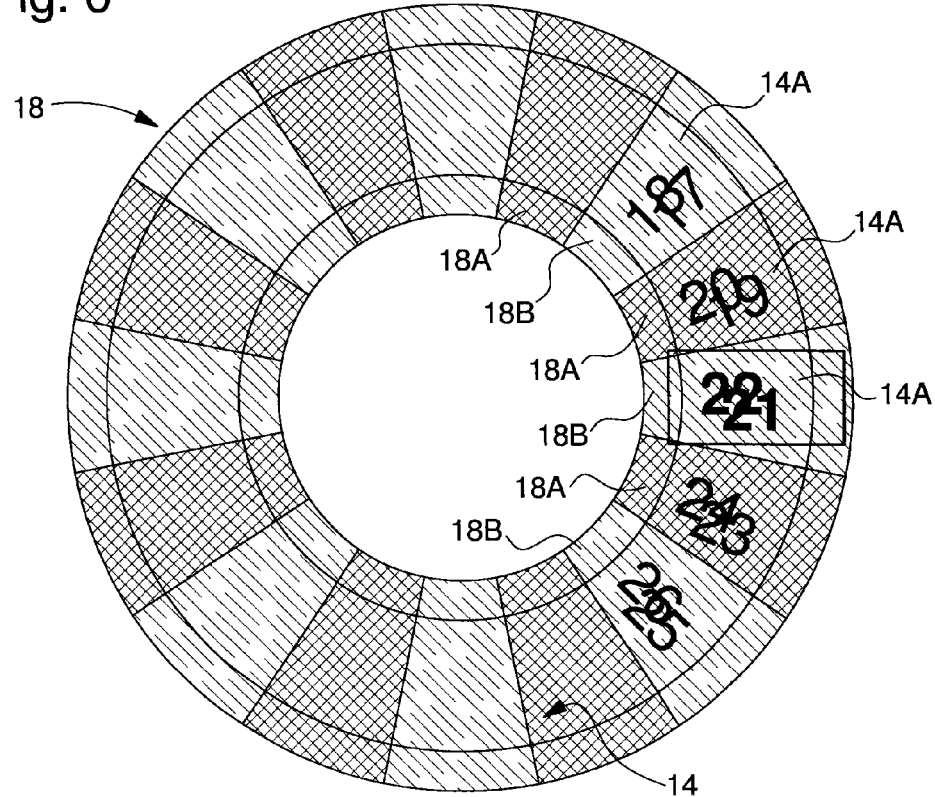
FIG. 6 is a top view of a date ring above which is arranged an optical filter in the form of a ring, the ring being divided into a plurality of first and second areas which follow each other alternately and which are respectively in a first and a second colour, the first areas in the first colour revealing the date indications of the first group and concealing the date indications of the second group, and the second areas in the second colour revealing the date indications of the second group and concealing the date indications of the first group.

FIG. 6 is a top view of a date ring 14 which has on the periphery thereof sixteen printing areas 14A distributed over 360°. A ring-shaped optical filter 18 is arranged above date ring 14, ring 18 being divided into a plurality of first and second areas 18A, 18B which follow each other alternately and which are respectively in a first and a second colour, the first areas 18A in the first colour revealing the date indications of the first group and concealing the date indications of the second group, and second areas 18B in the second colour revealing the date indications of the second group and concealing the date indications of the first group.

Figure 7:
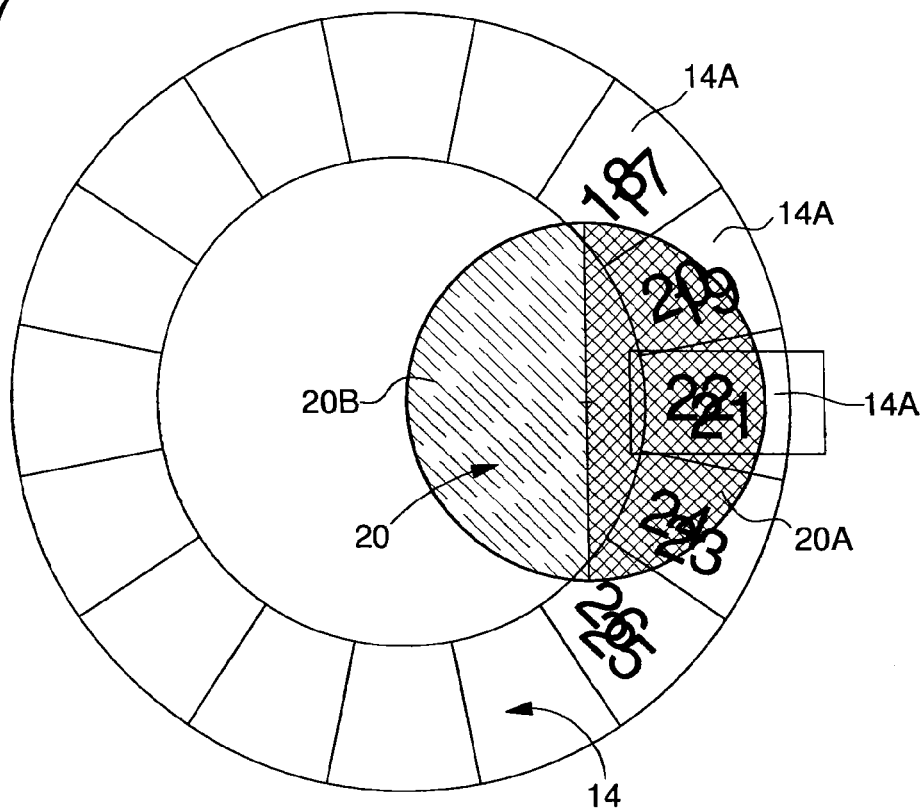
FIG. 7 is a top view of a date ring and an optical filter in the form of a disc arranged above the aperture in the dial, a first portion of the disc having a first colour to reveal the date indications belonging to the first group and to conceal the date indications of the second group, and a complementary portion of the first portion of the disc having a second colour to reveal the date indications belonging to the second group and to conceal the date indications belonging to the first group.

FIG. 7 is a top view of a date ring 14 which has on the periphery thereof sixteen printing areas 14A distributed over 360°. An optical filter 20 in the form of a disc arranged above the aperture in the dial has a first portion 20A which is in a first colour to reveal the date indications belonging to the first group and concealing the date indications of the second group, and a complementary portion 20B of first portion 20A of disc 20 is in a second colour to reveal the date indications belonging to the second group and concealing the date indications belonging to the first group.

Figure 8:
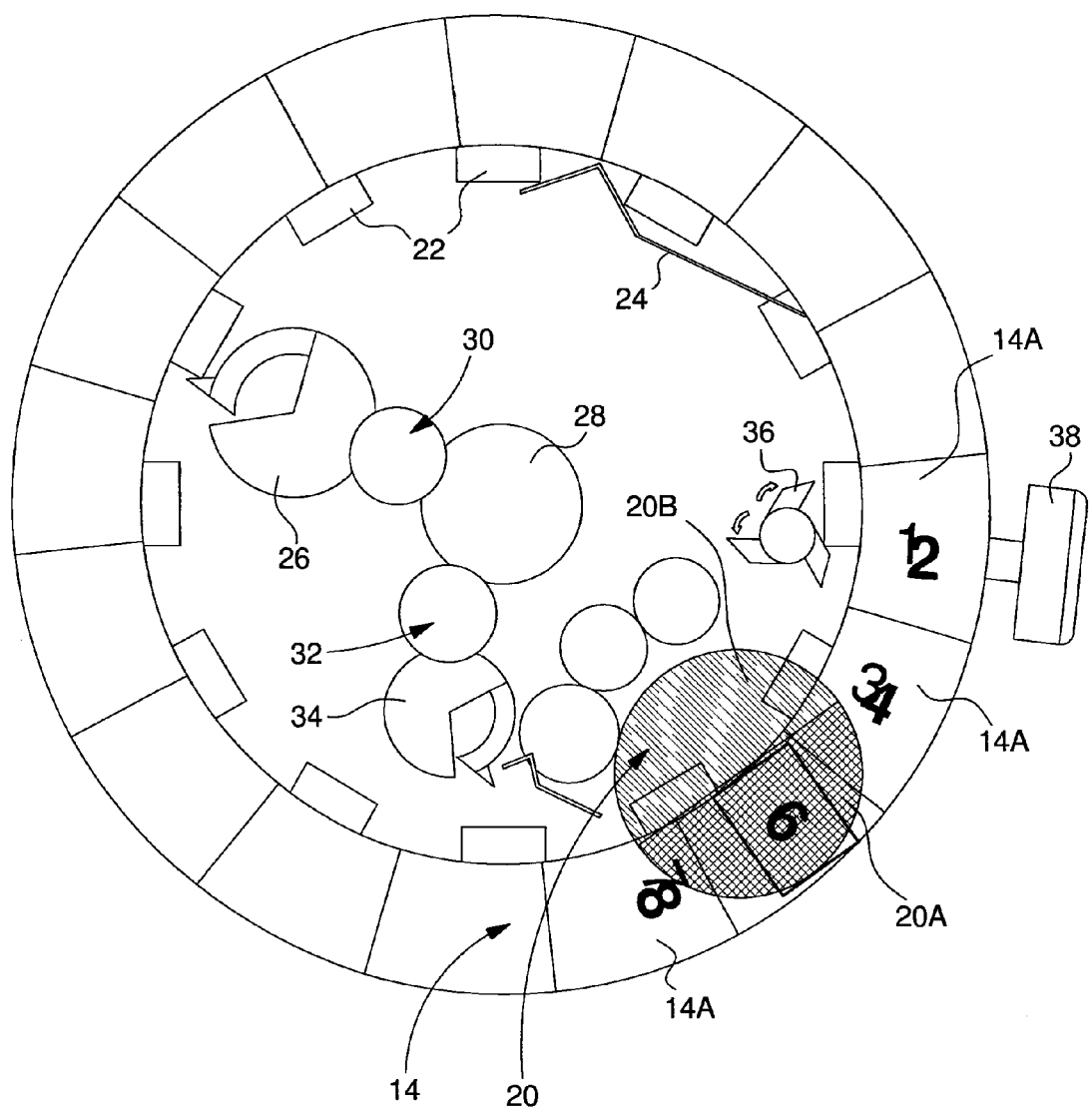
FIG. 8 illustrates an example embodiment of the device for displaying a date indication according to the invention.

An example embodiment of a date indication display device 1 according to the invention is illustrated in FIG. 8. This display device 1 includes date ring 14 and optical filter disc 20 illustrated in FIG. 7. The position of date ring 14, which has an inner toothing 22, is indexed by a jumper spring 24. Date ring 14 is conventionally driven by a drive wheel 26 which is in mesh with an hour wheel 28 of the watch movement via a gear train 30. The gear ratio between hour wheel 28 and drive wheel 26 is calculated to cause the necessary forward movement of date ring 14. This gear ratio may, for example, be calculated so that date ring 14 advances one step every two days. Likewise, hour wheel 28 drives a drive wheel 34 of optical filter 20 via a gear train 32. The gear ratio between hour wheel 28 and drive wheel 34 may, for example, be calculated so that optical filter 20 advances one step per day. A sliding pinion 36 controlled by a crown 38 can manually correct the position of date ring 14 and of optical filter 20. To achieve this, sliding pinion 36 is, for example, directly meshed with date ring 14 and in mesh with optical filter 20 via a gear train 40. In a conventional manner, when crown 38 is rotated in one direction, sliding pinion 36 meshes with date ring 14 and causes the latter to advance, and when crown 38 is rotated in the opposite direction, sliding pinion 36 meshes with optical filter 20 which advances.

FIG. 1 shows a vertical cross-section of a support element 4 with printing areas 4A, filters 12A, 12B and a dial 10 with its aperture 8.

Figure 2:
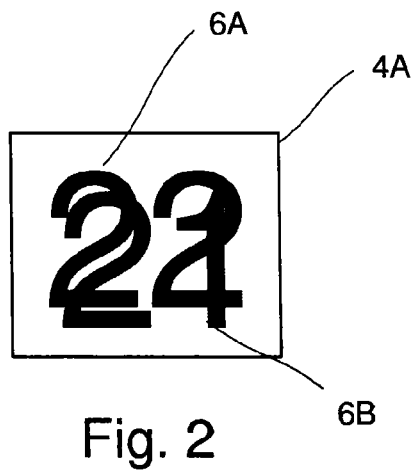
FIG. 2 is a top view of the aperture arranged in the watch dial and through which appear a superposed first and second date indication with no optical filters.
Figure 3:
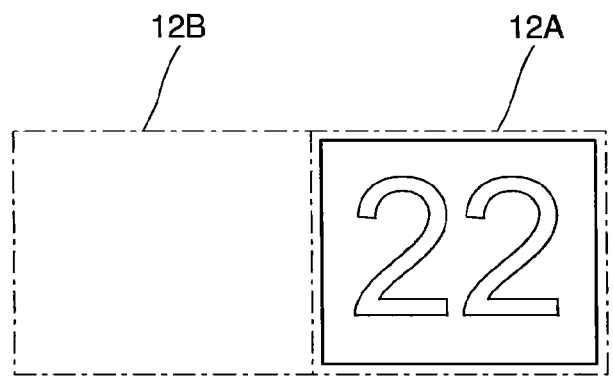
FIG. 3 is a similar view to that of FIG. 2, in which the first optical filter reveals the date indication belonging to the first group and conceals the date indication belonging to the second group.
Figure 4:
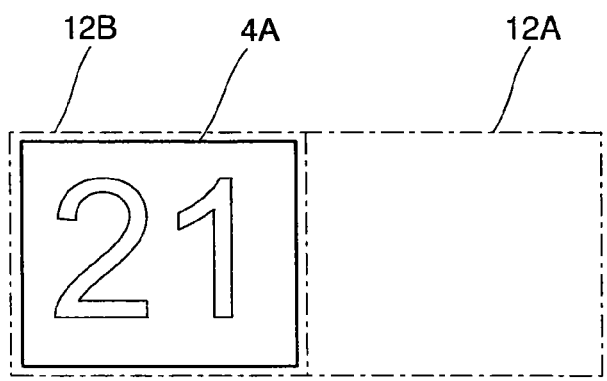
FIG. 4 is a similar view to that of FIG. 2 in which the second filter reveals the date indication belonging to the second group, and conceals the date indication belonging to the first group.

FIG. 2 shows the date indications "21" and "22" seen through aperture 8 of watch dial 10 without filters 12A, 12B.

It goes without saying that this invention is not limited to the embodiments that have just been described and that various simple alterations and variants can be envisaged by those skilled in the art without departing from the scope of the invention as defined by the annexed claims. It will be understood in particular that the colour and the filter are chosen according to the desired result. Care will be taken to choose colours that are sufficiently far apart and/or filters that are more or less selective. Absorption filters which are less effective than reflection filters may be used. It will also be understood that instead of using a single support element 4 in each display area on which are superposed a date indication 6A of the first group and a date indication 6B of the second group, it is possible to envisage using two support elements arranged one on top of the other, a first support element bearing the date indications 6A of the first group and a second support element, visible through the first support element, bearing the date indications 6B of the second group.

What is claimed is:

1. A date indication display device for a timepiece, wherein the display device includes a support element having a plurality of display areas on which are arranged the indications of the days of the month, wherein the support element moves behind an aperture arranged in a dial of the timepiece to reveal one of the date indications arranged on the support element, wherein:
   a) the indications of the days of the month are divided into a first and a second group, the date indications of the first group having a first colour, and the date indications of the second group having a second colour, different from that of the date indications of the first group;
   b) the number of display areas of the support element is equal to the number of date indications in a group, wherein a date indication of the first group is superposed on a date indication of the second group on each display area;
   c) a first optical filter whose transmittance is chosen to transmit the first colour and to block the second colour, and a second optical filter whose transmittance is chosen to transmit the second colour and to block the first colour, wherein the first and second optical filters are alternately positioned behind the aperture.

2. The display device according to claim 1, wherein one of the groups comprises the odd numbers (01, 03, 05, . . . , 15, . . . 31) and the other the even numbers (02, 04, . . . , 16, . . . 30).

3. The display device according to claim 2, wherein the kinematics of the date indication display device are configured to move the date indication support element every day and the first and second optical filters every fifteen days, or to move the date indication support element every other day and the first and second optical filters every day.

4. The display device according to claim 1, wherein one of the groups comprises the numbers from 01 to 15, and the other the numbers from 16 to 31.

5. The display device according to claim 4, wherein the kinematics of the date indication display device are configured to move the date indication support element every day and the first and second optical filters every fifteen days, or to move the date indication support element every other day and the first and second optical filters every day.

6. The display device according to claim 1, wherein the support element is a ring or a disc.

7. The display device according to claim 1, wherein the first and second optical filters take the form of a disc or a ring divided into two.

8. The display device according to claim 1, wherein the first and second optical filters take the form of a ring divided into a plurality of first and second areas which follow each other alternately and which are respectively in a first and a second colour, the first areas in the first colour revealing the date indications of the first group and concealing the date indications of the second group, and second areas in the second colour revealing the date indications of the second group and concealing the date indications of the first group.

9. The display device according to claim 1, wherein the first and second optical filters are absorption or reflection filters.

* * * * *